United States Patent
Chen et al.

(10) Patent No.: US 9,619,493 B2
(45) Date of Patent: Apr. 11, 2017

(54) SYSTEM FOR ACHIEVING NON-INTERRUPTIVE DATA RECONSTRUCTION

(71) Applicant: ProphetStor Data Services, Inc., Taichung (TW)

(72) Inventors: Wen Shyen Chen, Taichung (TW); Sheng Wei Chen, Taichung (TW); Bernard Jay Wu, Milpitas, CA (US)

(73) Assignee: Prophestor Data Services, Inc., Taichung (TW)

( * ) Notice: Subject to any disclaimer, the term of this patent is extended or adjusted under 35 U.S.C. 154(b) by 315 days.

(21) Appl. No.: 14/490,342

(22) Filed: Sep. 18, 2014

(65) Prior Publication Data

US 2016/0085836 A1 Mar. 24, 2016

(51) Int. Cl.
G06F 17/30 (2006.01)

(52) U.S. Cl.
CPC ...... *G06F 17/303* (2013.01); *G06F 17/30575* (2013.01)

(58) Field of Classification Search
CPC ............. G06F 17/30215; G06F 3/0619; G06F 3/0637; G06F 3/0647; G06F 3/0664; G06F 3/0665; G06F 3/30575
USPC ...................................................... 707/639
See application file for complete search history.

(56) References Cited

U.S. PATENT DOCUMENTS

| | | | | |
|---|---|---|---|---|
| 8,407,435 B2 * | 3/2013 | Fienblit | ............... | G06F 11/1466 711/162 |
| 8,548,949 B2 * | 10/2013 | Jennas, II | ......... | G06F 17/30215 707/649 |
| 9,128,628 B1 * | 9/2015 | Natanzon | ................ | G06F 3/065 |
| 2008/0183988 A1 * | 7/2008 | Qi | ........................ | G06F 11/2066 711/162 |
| 2010/0082921 A1 * | 4/2010 | Thompson | .......... | G06F 11/2071 711/162 |
| 2012/0078848 A1 * | 3/2012 | Jennas, II | ......... | G06F 17/30215 707/649 |
| 2012/0124307 A1 * | 5/2012 | Ashutosh | ............ | G06F 11/1451 711/162 |
| 2012/0210064 A1 * | 8/2012 | Coronado | ........... | G06F 11/2069 711/118 |
| 2012/0239893 A1 * | 9/2012 | Jennas, II | ......... | G06F 17/30215 711/162 |
| 2013/0036091 A1 * | 2/2013 | Provenzano | ...... | G06F 17/30162 707/624 |
| 2013/0117286 A1 * | 5/2013 | Gallant | ..................... | G06F 7/24 707/752 |
| 2013/0212345 A1 * | 8/2013 | Nakajima | .............. | G06F 3/0605 711/161 |

* cited by examiner

*Primary Examiner* — Jean M Corrielus
(74) *Attorney, Agent, or Firm* — Che-Yang Chen; Law Offices of Scott Warmuth (57) ABSTRACT

A system for achieving non-interruptive data reconstruction is disclosed. The system includes a source storage, a target storage, a server, a traffic modeling unit and at least one data moving service unit. With the help of traffic modeling unit, a period of time of low access can be estimated. Data reconstruction (copying or moving) can be carried on during the period of time. Thus, non-interruptive data reconstruction can be done.

16 Claims, 8 Drawing Sheets

SYSTEM FOR ACHIEVING NON-INTERRUPTIVE DATA RECONSTRUCTION

FIELD OF THE INVENTION

The present invention relates to a system for achieving data reconstruction. More particularly, the present invention relates to a system for achieving non-interruptive data reconstruction for cloud hosts. When the system works, the host can smoothly function while accessed data has been copied or moved from one storage to another.

BACKGROUND OF THE INVENTION

For cloud services, there are often several key units, for example, an application server (host) and several storages, requested to operate. The storage may contain hard disks and form a RAID (Redundant Array of Independent Disks) with a number of LUN (Logical Unit Number) device assigned therein, or the storage may contain hard disks and store numbers of object storage data. In order to prevent the storage from aging and partial failure, upgrade to faster storage for better performance, or downgrade to more economical storage for the cost reason, data storage in one storage (or LUN) should be copied to or moved to another storage (or LUN) after a period of time of use. The reconstruction of data may be a means of data backup or data migration. Of course, the storages may be separated in different locations. Data transmission can be done over LAN (Local Area Network) or WAN (Wide Area Network).

Figure 1:
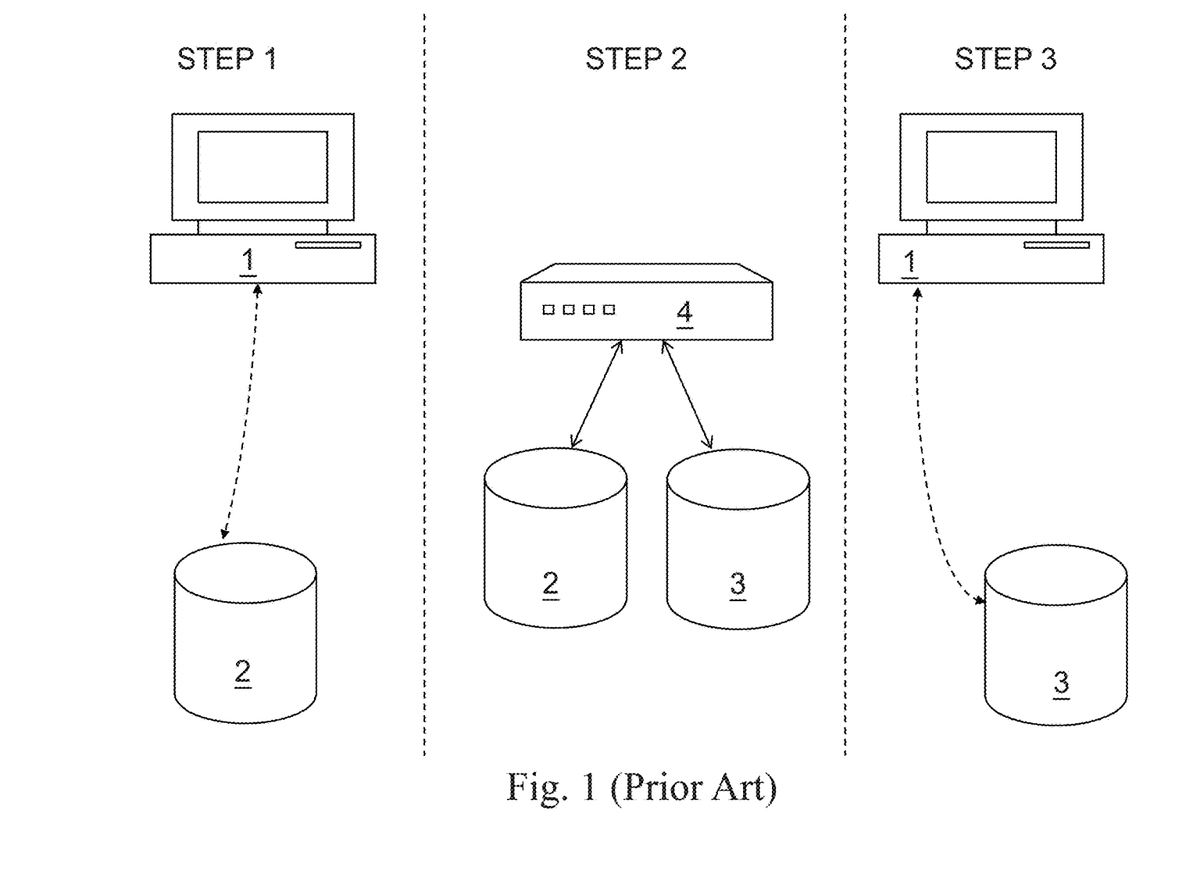
FIG. 1 shows a system operated by an offline method.

Conventionally, there are three methods to implement data copying or moving (reconstructing), i.e. offline method, mirroring method and dual write and snapshot image copying method. For the offline method, please refer to FIG. 1. Three steps are applied in the offline method. An application server 1 accesses data in a source storage 2 in STEP 1. These access operations are requested by users. In STEP 2, a data duplicating server 4 is in charge of data reconstruction from the source storage 2 to a target storage 3. Meanwhile, the application server 1 is shut down and doesn't provide services. When the data reconstruction in the target storage 3 is complete in STEP 3, the application server 1 boots and links to the target storage 3. Thus, the service that the application server 1 provides can keep going on. Although the offline method is simple to implement, it has a problem of service interruption. For busy cloud services, it is not acceptable.

Figure 2:
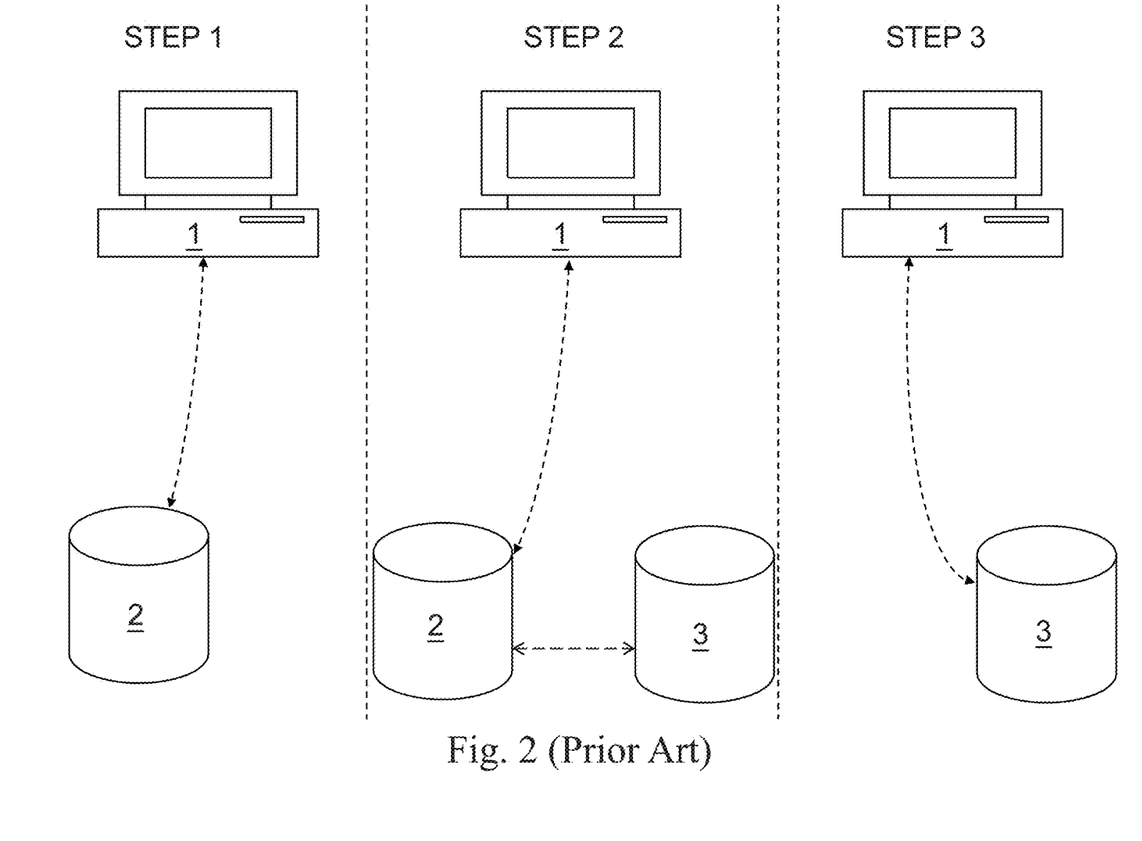
FIG. 2 shows a system operated by a mirroring method.

The mirroring method is illustrated in FIG. 2. There are also three main steps. STEP 1 describes an application server 1 that links to and accesses a source storage 2 while the data in the source storage 2 is going to be reconstructed in a target storage 3. In STEP 2, the source storage 2 starts mirroring-like-service and duplicates the data it contains to the target storage 3. After STEP 2 is completed, the source storage 2 and the target storage 3 switch roles, and the application server 1 links to and accesses the target storage 3 (now, it becomes a source storage) as shown in STEP 3 in FIG. 2.

Different from the offline method, the storages used in the mirroring method must be provided by the same vendor or run by one-storage hypervisor. Mirroring function must be available between the storages. If the efficiency of the target storage 3 is worse than that of the source storage 2, the application server 1 will experience service interruption. Meanwhile, additional mirroring sync of the storages will affect the performance of the source storage 2. Most important of all, the application server 1 needs to reboot to switch over source storage's identity to that of the target storage. It incurs another interruption.

Figure 3:
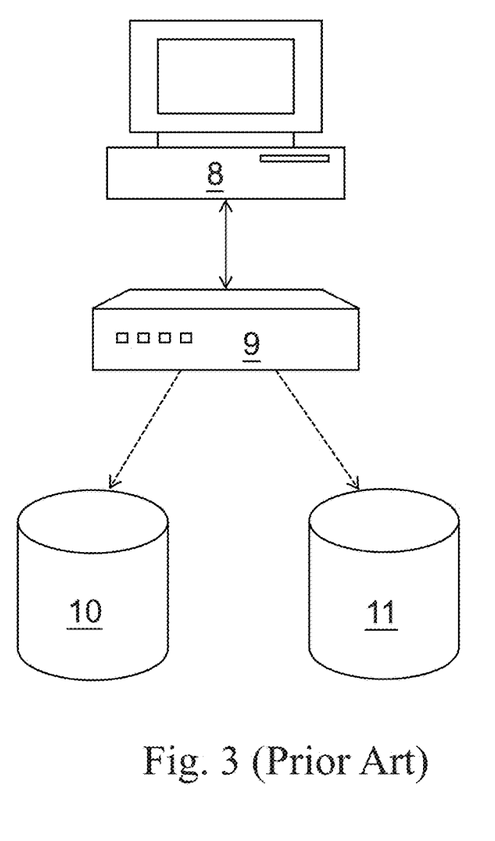
FIG. 3 shows a system operated by a dual write and snapshot image copying method.

The dual write and snapshot image copying method is illustrated in FIG. 3. An external in-band data moving service unit 9 links to an application server 8, a source storage 10 and a target storage 11. A scheduled downtime is needed for implementing the in-band infrastructure of the data moving service unit 9. It issues a snapshot command to the source storage 10 and starts copying the snapshot image to the target storage 11. The 'dual write' is because after the snapshot point of time, the data moving service unit 9 processes all new write commands to the source storage 10 and the target storage 11. Finally, the source storage 10 and the target storage 11 switch roles when the copy of the snapshot image completes and all new writes are done.

In addition to the in-band infrastructure which causes bottleneck of data reconstruction, the dual write and snapshot image copying method also makes the application server 8 experience service interruption since the source storage 10 needs to process read and write operations at the same time for a long period until both snapshot image copying and new write commands operations are completed. The dual write and snapshot image copying method is still not so convenient for data copying or moving.

Hence, a system for achieving non-interruptive data reconstruction, especially applied in storages for the servers of cloud services, is required.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

As mentioned above, available systems for data moving or copying are interruptive. Therefore, a system for achieving non-interruptive data reconstruction is desired. According to an aspect of the present invention, a system for achieving non-interruptive data reconstruction includes: a source storage, containing a source data; a target storage; a server, for accessing the source data in the source storage and any data stored in the target storage, installed with an agent module and a path IO module, wherein the agent module keeps collecting values of several performance parameters (such as iops, latency, and throughput, etc.), which present a status of accessing the source data by the server and records changed blocks of the source storage to a bitmap table generated by the path IO module after a snapshot of the source storage; the path IO module decouples a storage name of the source storage which links to the server and couples to that of the target storage so that a switch-over of linkage path of the server from the source storage to the target storage is achieved; a traffic modeling unit, receiving the values of the performance parameter and capable of providing a traffic status of data access in a particular time in the future according to the received values of the performance parameters, for providing an action schedule according to a defined policy and the traffic status of data access; and at least one data moving service unit, for snapshotting a portion or the whole source storage, copying a snapshot of the portion or the whole source storage to the target storage, and modifying changes of a new snapshot of the portion or the whole source storage compared with the previous one to the copied snapshot in the target storage according to the action schedule, and controlling the operation of the agent module.

The agent module communicates with the traffic modeling unit and the at least one data moving service unit. The bitmap table contains a bit of 0 or 1 for each block in the source storage. 0 stands for no change in the corresponding block while 1 stands for change in the corresponding block between two successive snapshots. The switch-over is processed when the number of 1 in the bitmap table is smaller than or equal to a threshold value.

Preferably, the source storage is a Hard Disk Drive (HDD), a Solid State Drive (SSD), a Random Access Memory (RAM), a mixture thereof, a Logical Unit Number (LUN) device, or an object storage data. Similarly, the target storage is also a Hard Disk Drive (HDD), a Solid State Drive (SSD), a Random Access Memory (RAM), a mixture thereof, a Logical Unit Number (LUN) device, or an object storage data.

The agent module is a software, a hardware or a firmware. Similarly, the path IO module is a software, a hardware or a firmware.

According to the present invention, the performance parameters are Input/Output operations per Seconds (IOPS), latency, and/or throughput. The action schedule assigns the time that snapshotting the portion or the whole source storage, copying the snapshot of the portion or the whole source storage to the target storage, modifying changes of a new snapshot of the portion or the whole source storage compared with the previous one to the copied snapshot in the target storage and processing the switch-over to take place when the source storage is expecting no accesses of data therein or light accesses of data. The condition of light accesses of data is defined in a Service Level Agreement (SLA), a Quality of Service (QoS) requirement or the defined policy based on specifications of the source storage or target storage.

Preferably, the defined policy defines a delay time to stop copying the snapshot of the portion or the whole source storage to the target storage and modifying changes of a new snapshot of the portion or the whole source storage compared with the previous one to the copied snapshot in the target storage in case the said action fails to meet a requirement in a SLA or a QoS requirement. Also, the defined policy defines a waiting time to retry copying the snapshot of the portion or the whole source storage to the target storage or modifying changes of a new snapshot of the portion or the whole source storage compared with the previous one to the copied snapshot in the target storage in case the said action fails to meet a requirement in a SLA or a QoS requirement. The storage name comprises model name, model number, and/or serial number of the source storage or the target storage.

In order to operate the system, a procedure includes the steps of: A. the traffic modeling unit providing the action schedule; B. the data moving service unit instructing the source storage to snapshot a portion or the whole source storage, and the agent and path IO modules to record the changed blocks of the source storage to the bitmap table with initiation of all 0; C. the data moving service unit copying the snapshot to the same blocks in the target storage sequentially according to the action schedule; D. the data moving service unit modifying changes of the snapshot of the portion or the whole source storage to the copied snapshot in the target storage; E. repeating the step B to step D until the number of 1 in the bitmap table is smaller than or equal to the threshold value; and F. the data moving service unit processing the switch-over of linkage path of the server from the source storage to the target storage, and/or relinking to the source storage depending on the user's needs. Here, the threshold value is 0.

The procedure mentioned above further includes a step B1 between step B and step C and a step G after step F: B1. if step B to step D having been repeated at least once, the number of 1 in the bitmap table being smaller than the threshold value, and the traffic status of data access being expected low in a timeframe in the coming future so that the data moving service unit calculates to know that the copying of the snapshot can be finished within a requirement in a SLA, the data moving service unit initiating the agent module to hold all data write commands to the source storage; and G. the data moving service unit instructing the agent module to release all data writes to the new source storage, which may be the target storage or the source storage. The threshold value is any integer smaller than 10.

The procedure can further includes a step B2 between step B and step C and a step E1 between step E and step F: B2. if step B to step D having been repeated at least once, the number of 1 in the bitmap table being smaller than the threshold value, and the traffic status of data access being expected low in a timeframe in the coming future so that the data moving service unit calculates to know that the copying of the snapshot can be finished within a requirement in a SLA, the agent module informing the data moving service unit about new block write commands to the source storage; and E1. The data moving service unit processing the new block write commands to the corresponding blocks in the target storage. The threshold value is any integer smaller than 10.

With the help of traffic modeling unit, a period of time of low access can be estimated. Data reconstruction (copying or moving) can be carried on during the period of time. Thus, non-interruptive data reconstruction can be done. Meanwhile, no matter the source storage or the target storage come from the same manufacturer or not, or the storages are physical storage devices or LUNs, or object storage data, the system can be applicable.

DETAILED DESCRIPTION OF THE PREFERRED EMBODIMENTS

The present invention will now be described more specifically with reference to the following embodiments.

Figure 4:
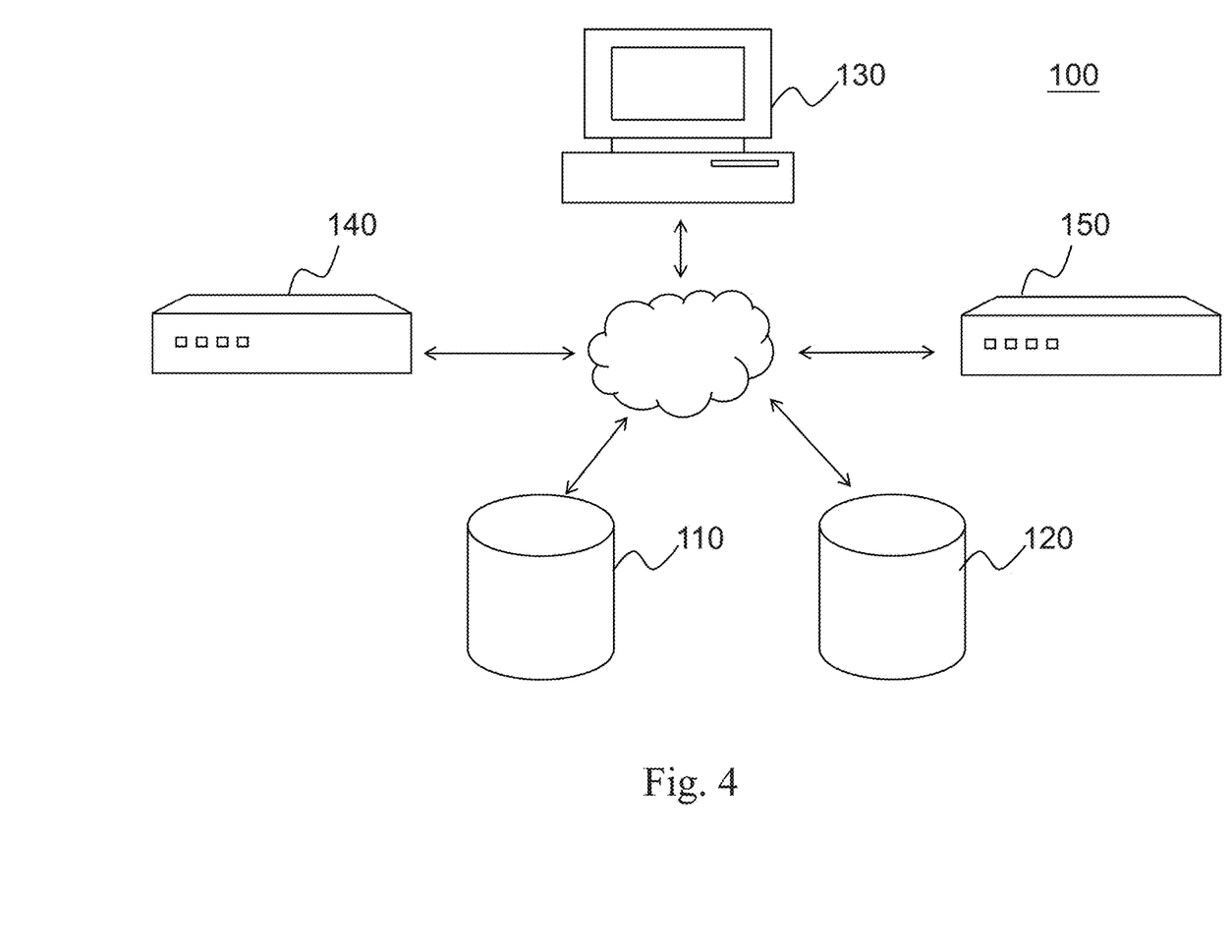
FIG. 4 shows a system for achieving non-interruptive data reconstruction according to the present invention.
Figure 5:
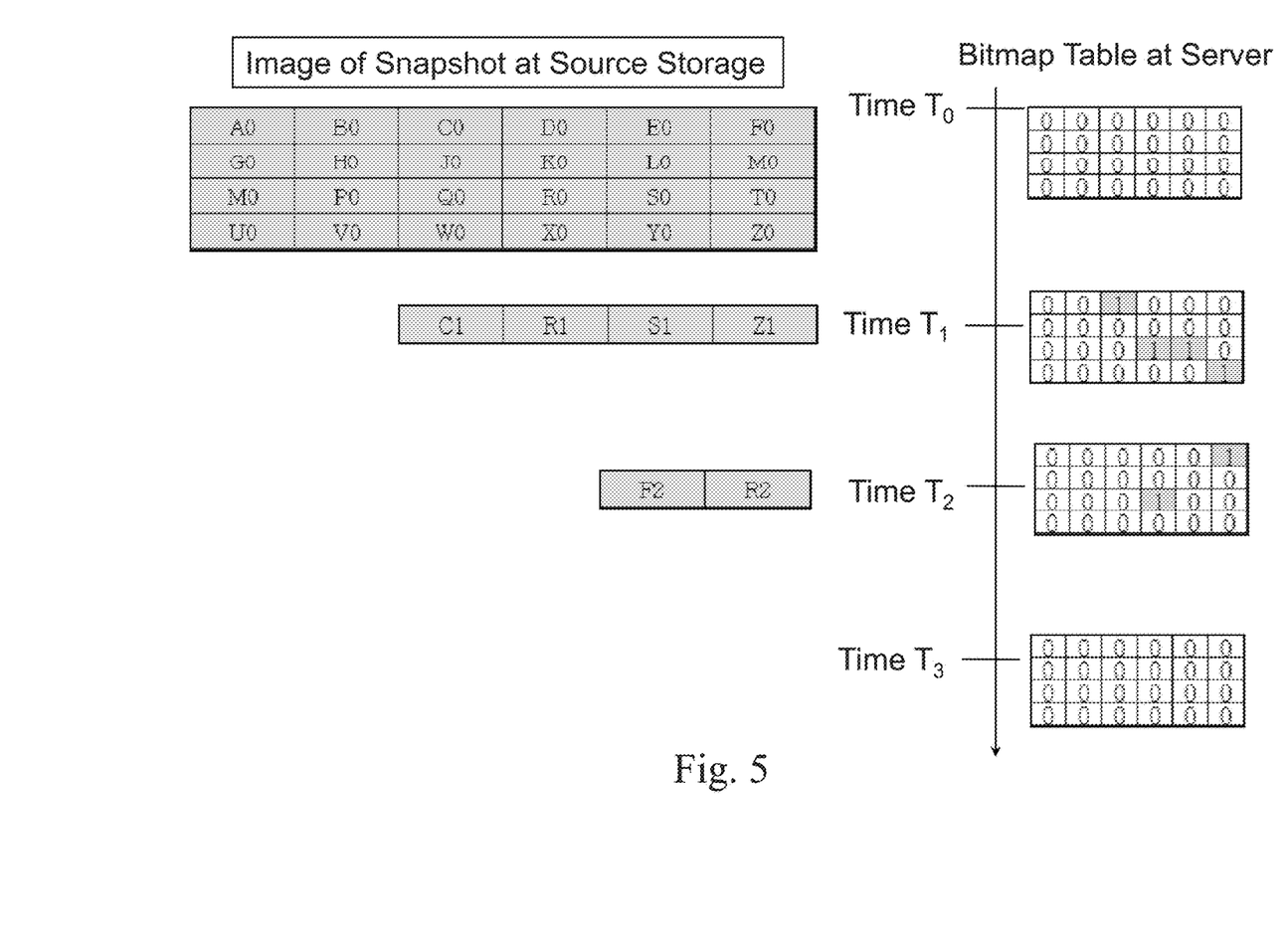
FIG. 5 illustrates a bitmap table used in the present invention.
Figure 6:
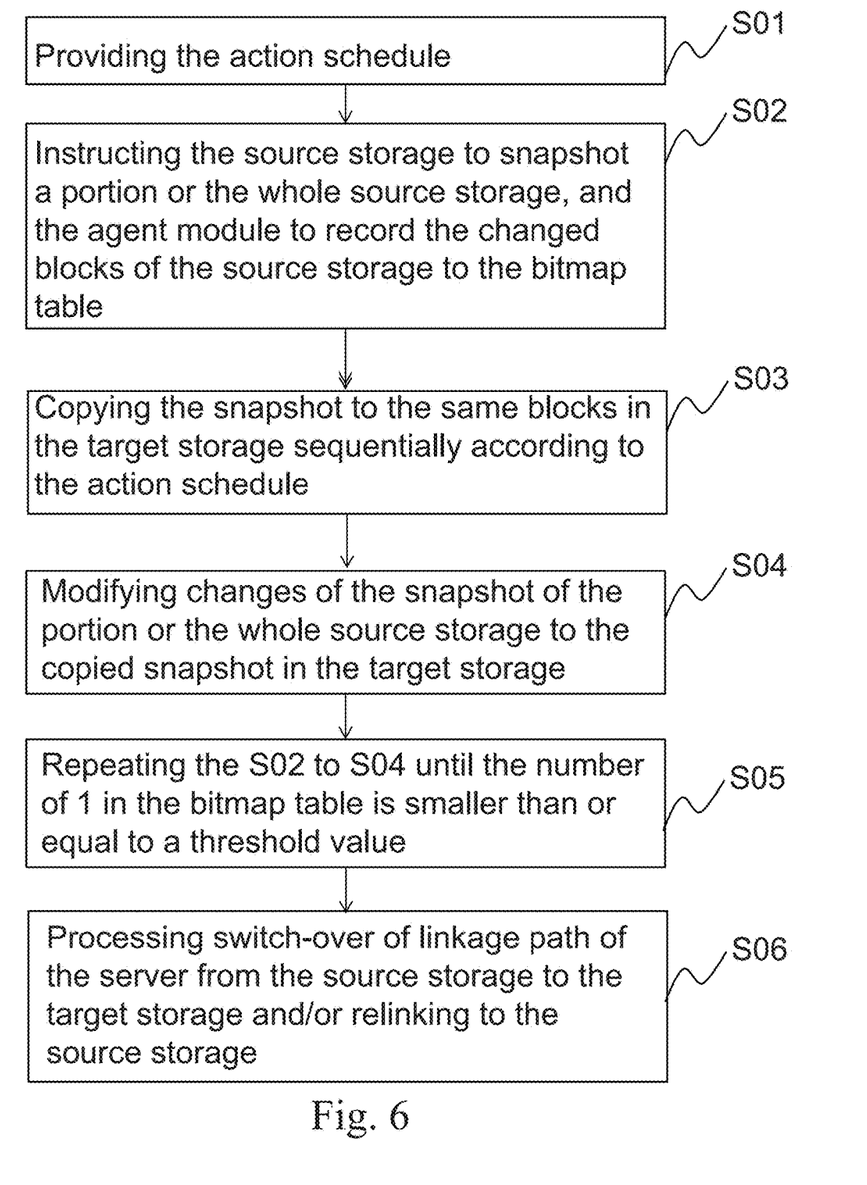
FIG. 6 is a flowchart of a procedure for operating the system.

Please refer to FIG. 4 to FIG. 6. An embodiment of the present invention is disclosed. A system 100 which is capable of achieving non-interruptive data reconstruction is shown in FIG. 4. The term "reconstruction" means that a data in one storage may be copied to or moved to another one. If the data is moved to another storage, the data in the original source storage will not be accessed or not be useful after the reconstruction. The data reconstruction can be non-interruptively done so that one or more servers which access the original storage will not break off and services provided thereby can remain intact. According to the present invention, the system 100 at least contains a source storage 110, a target storage 120, a server 130, a traffic modeling unit 140, and a data moving service unit 150. Functions of the devices mentioned above and operating processes will be disclosed in details below.

The source storage 110 and the target storage 120 used in the present embodiment are both Hard Disk Drives (HDDs). Characteristics of the source storage 110 and the target storage 120, such as capacity, revolutions per minute, power consumption, etc., can be the same, partially the same or totally different. Namely, the two storages may come from the same manufacturer or not, not like the mirroring method which requests the two storages must be of the same specs. In practice, the source storage 110 or the target storage 120 may be a Solid State Drive (SSD), a Random Access Memory (RAM), or a mixture of at least two of a HDD, a SSD and a RAM. The source storage 110 or the target storage 120 can also be a Logical Unit Number (LUN) device, or is an object storage data for data storing purpose.

The number of physical storage device used in the source storage 110 and the target storage 120 is not limited to one. For example, in another embodiment, the source storage 110 may contain a number of HDDs which form a Redundant Array of Independent Disks (RAID) while the target storage 120 is a HDD with storage capacity equal to that of the RAID. The source storage 110 may contain a lot of datum or file waiting for copying or moving. In order to have a comprehensive understanding of the present invention, only a source data is stored in the source storage 110.

The server 130 is used to access the source data in the source storage 110. Therefore, the server 130 can provide a specific service, for example, music streaming. The server 130 can also access any data stored in the target storage 120. It should be emphasized that the linkage between the server 130 and the source storage 110, or between the server 130 and the target storage 120 in this embodiment can be locally attached, go through a Local Area Network (LAN), or go through a Wide Area Network (WAN) such as internet. The server 130 may provide the service to a limited group of users in LAN or WAN. The server 130 has installed an agent module and a path IO module (not shown). The agent module or the path IO module can be in form of a software, a hardware or a firmware to fulfill its functions. In this embodiment, the agent module and the path IO module are both software installed in the server 130.

As to the functions, the agent module can keep collecting values of a performance parameter which present a status of accesses of the source data by the server 130. Here, the performance parameter is Input/Output Operations per Second (IOPS). These historical data of accesses by users through the server 130 will be sent to the traffic modeling unit 140 for further analysis. There are other available performance parameters for data access analysis. For example, latency, and/or throughput can be used. The present invention doesn't limit to collect values of specific performance parameter as long as the values are accepted by the traffic modeling unit 140. This will be illustrated later. The agent module can record changed blocks of the source storage 110 to a bitmap table generated by the path IO module after a snapshot of the source storage 110. Since the system 100 is used to process data copying and moving, snapshot is a main method for achieving the target. How to trace and control differences between the snapshot of the source storage 110 and the copied snapshot in the target storage 120 due to write commands after the snapshot is important. The bitmap table that the agent module utilizes is stored in the server 130.

Please refer to FIG. 5. The bitmap table contains a bit of 0 or 1 for each block in the source storage 110. 0 stands for no change in the corresponding block while 1 stands for change in the corresponding block between two successive snapshots. For example, when the snapshot takes place at $T_0$, all values in an array of the bitmap table for the 24 blocks are 0 since there are no change for the data structure. Actually, the data structure contains only the source data. The source data has not been written, so the snapshot doesn't change. When time comes to $T_1$, another snapshot is taken. It is found that the source data has been written and some blocks changed. There are 4 changed blocks, where the changes are $C_0$->$C_1$, $R_0$->$R_1$, $S_0$->$S_1$, and $Z_0$->$Z_1$. The corresponding bits in the array turn to be 1 while other bits remain 0. When time comes to $T_2$, the source storage is taken a third snapshot. The source data has been written again and still some blocks changed. The changes between time $T_1$ and $T_2$ are $F_0$->$F_2$ and $R_1$->$R_2$. It is clear that the block of $R_2$ changes twice while the block of $F_2$ changes only once. However, no matter how many times the block changes due to write command, the corresponding bit will definitely changes from 0 to 1. Finally, at $T_3$, there is no change between successive snapshots. All bits in the bitmap table are 0 again. This is how the bitmap table operates.

The path IO module can decouple a storage name of the source storage 110 which links to the server 130 and couple to a storage name of the target storage 120. It functions so that a switch-over of linkage path of the server 130 from the source storage 110 to the target storage 120 can be achieved. The path IO module controls the path that the server 130 accesses. The storage name contains data of model name, model number, and/or serial number of the source storage 110 or the target storage 120. It can contain other information about the specs of the source storage 110 or the target storage 120. When the path IO module decouples the storage name of the source storage 110, the server 130 can not connect with and access the source storage 110. When the path IO module couples to the storage name of the target storage 120, the server 130 connects with the target storage 120 and access therebetween is available. After the actions of decoupling and coupling, the path IO module switches over access paths of the server 130.

The traffic modeling unit 140 can receive the values of the IOPS (performance parameter) from the agent module. It is capable of providing a traffic status of data access in a particular time in the future according to the received values of the IOPS. The traffic status is a physical data that demonstrates how the access of the server 130 to the source storage 110 is. For example, the traffic status may be IOPS in any time after 5 minutes. However, the traffic status must be available from collecting historically accumulated IOPS and analyzing them. Any suitable methods, algorithms or modules that provide such service can be applied. It is best to utilize a storage traffic modeling system provided by the same inventor in U.S. patent application Ser. No. 14/290,533. Co-reference of the same techniques can be acquired from the application. Therefore, the traffic modeling unit 140 can provide an action schedule according to a defined policy and the traffic status of data access.

Here, the action schedule is a set of instructions to operate the system 100 at the best timing. For instance, the action schedule assigns the time that snapshotting the portion or the whole source storage 110, copying the snapshot of the portion or the whole source storage 110 to the target storage 120, modifying changes of a new snapshot of the portion or the whole source storage 110 compared with the previous one to the copied snapshot in the target storage 120 and processing the switch-over to take place when the source storage is expected to encounter no accesses of data therein or light accesses of data. The condition of light accesses of data may be defined in a Service Level Agreement (SLA), a Quality of Service (QoS) requirement or the defined policy based on the specifications of the source storage 110 or target storage 120. It should be emphasized that the whole action schedule is based on a forecast of traffic status in the future; the action schedule would be modified by the defined policy and reevaluated once un-expected conditions happen.

The defined policy is different from the SLA or the QoS requirement that is signed and agreed by the manufacturer of the system 100 to the operator of the service provider owned the system 100 before the system 100 is on-line. The defined policy sets detailed operations of the system 100 to implement the service for the SLA or QoS requirement. Specifically, the defined policy defines a delay time to stop copying the snapshot of the portion or the whole source storage 110 to the target storage 120 and modifying changes of a new snapshot of the portion or the whole source storage 110 compared with the previous one to the copied snapshot in the target storage 120 in case the said action fails to meet a requirement in a SLA or QoS requirement. For example, if the SLA asks response of a request of a user by the server 130 should not be longer than 2 seconds, when the time of copying the snapshot is longer than the delay time of 5 seconds which may lead to a response time more than 2 seconds, the whole copying operation stops. The copying of the snapshot will be held for 30 seconds or until the access of the server 130 is expected to be lower than a certain IOPS, e.g. 10,000 Mb/s, which will not postpone copying operation of the snapshot. In another example, if some of the blocks needed to be updated for some write commands are received during two snapshots, the defined policy will requests minimum time, e.g. 3 seconds, to process the action in case the SLA or QoS requirement can not be fulfilled. "5 seconds" of delay time, "30 seconds" of waiting, and "3 seconds" of minimum time are one aspect of the defined policy. There could be many times of snapshotting of the source storage 110 before the data copying or moving service is ready. The defined policy is applicable to all of them.

From the description above, the defined policy also defines a waiting time to retry copying the snapshot of the portion or the whole source storage 110 to the target storage 120 or modifying changes of a new snapshot of the portion or the whole source storage 110 compared with the previous one to the copied snapshot in the target storage 120 in case the said action fails to meet a requirement in the SLA or a QoS requirement. For example, it is the "30 seconds" of waiting.

The data moving service unit 150 can access the source storage 110 and the target storage 120 and communicate with the server 130 and the traffic modeling unit 140. Hence, it is in charge of the job to snapshot a portion or the whole source storage 110, copy the snapshot of the portion or the whole source storage 110 to the target storage 120, and modify changes of a new snapshot of the portion or the whole source storage 110 compared with the previous one to the copied snapshot in the target storage 120 according to the action schedule. It can also control the operation of the agent module. It should be noticed that the controlling function can be done because the agent module can communicate with the traffic modeling unit 140 and the data moving service unit 150. From another perspective, the agent module is a window of the server 130 to receive control instruction from the data moving service unit 150. For load distribution and balancing, there can be more than one data moving service unit 150 in the system. It will be described in details later in another embodiment.

Now, the procedure to operate the system 100 is illustrated. The procedure includes several steps. Please refer to FIG. 6. It is a flowchart of the procedure. Before data moving, the traffic modeling unit 140 kept collecting values of IOPS which presents the status of accesses of the source data by the server 130. Based on the collected values, the traffic modeling unit 140 can provide the action schedule (S01). When the data moving service kicks off, the data moving service unit 150 instructs the source storage 110 to snapshot the whole source storage 110. It also instructs the agent module to record the changed blocks of the source storage 110 to the bitmap table in the server 130 (S02). As mentioned above, the blocks are changed due to write commands to the source storage 110 between two snapshots. The bitmap table contains bits of all 0 to all corresponding blocks in the stage of initiation. When the data moving service unit 150 makes sure that a snapshot is made, it copies the snapshot to the same blocks in the target storage 120 sequentially according to the action schedule (S03). In S03, the data moving service unit 150 will follow the action schedule from the traffic modeling unit 140 to process copying of snapshot at the moment that the source storage 110 is expected to be of no access (IO) or light access. Thus, service interruption caused by the access from the server 130 could be avoided. Since the snapshot copying keeps going on, the whole copied snapshot in the target storage 120 is seldom rewritten entirely just for some changed blocks due to the write commands. The data moving service unit 150 modifies only changes of the snapshot of the whole source storage 110 to the copied snapshot in the target storage 120 (S04). As shown in FIG. 5, the number of changed blocks may decrease in next snapshot. By repeating S02 to S04, time convergence of the snapshot copying can be achieved. The repeating of steps will last until the number of 1 in the bitmap table is smaller than or equal to the threshold value (S05). Preferably, the threshold value is 0. It means there is no changed block between two successive snapshots of the source storage 110. Then, the data moving service unit 150 processes the switch-over of linkage path of the server 130 from the source storage 110 to the target storage 120, or relinking to the source storage 110 (S06) depending on the user's needs.

In detail, S06 contains a sub-step of switch-over which stops IO between the server 130 and the source storage 110. After the switch-over, the data moving service unit 150 will inform the path IO module through the agent module to change linkage path of the server 130 from the source storage 110 to the target storage 120. Thus, the target storage 120 becomes a new source storage. Or the data moving service unit 150 will inform the path IO module through the agent module to relink path of the server 130 to source storage 110 depending on the user's needs. As to the timing of the switch-over, it is all the same for the source storage 110 and the target storage 120. During data copying, since there is the traffic modeling unit 140, the server 130 doesn't process copying snapshot and switch-over when access loading is heavy. The service that the server 130 provides will not be affected. Non-interruption of data reconstruction (copying or moving) can be achieved.

For the description above, it is clear that the method for switch-over is to wait for no block change between two successive snapshots. As one may know, the situation that there is not write command between two successive snapshots is ideal. Therefore, a more practical method of switch-over or operating procedure is needed. The present invention provides other solutions.

If S02 to S04 have been repeated at least once, the number of 1 in the bitmap table being smaller than one threshold value and the traffic status of data access is expected low in a timeframe in the coming future so that the data moving service unit 150 can calculate to know that the copying of the snapshot can be finished within a requirement in a SLA, the data moving service unit 150 initiates the agent module to hold all data write commands to the source storage 110. The data moving service unit 150 instructs the agent module to release all data write commands to the target storage 120 or the source storage 110 after S06 depending on the user's needs. Preferably, the threshold value is any integer smaller than 10, for example 5. All data writes are sequentially done before the switch-over.

If the same premise that S02 to S04 have been repeated at least once, the number of 1 in the bitmap table being smaller than one threshold value and the traffic status of data access is expected low in a timeframe in the coming future so that the data moving service unit 150 can calculate to know that the copying of the snapshot can be finished within a requirement in a SLA, the agent module can inform the data moving service unit 150 about new block write commands to the source storage 110. After the changed blocks are modified between two successive snapshots are completed, the data moving service unit 150 processes the new block write commands to the corresponding blocks in the target storage 120. Then, S06 carries on. Similarly, the threshold value is any integer smaller than 10. Thus, all data writes are done before the switch-over.

Figure 7:
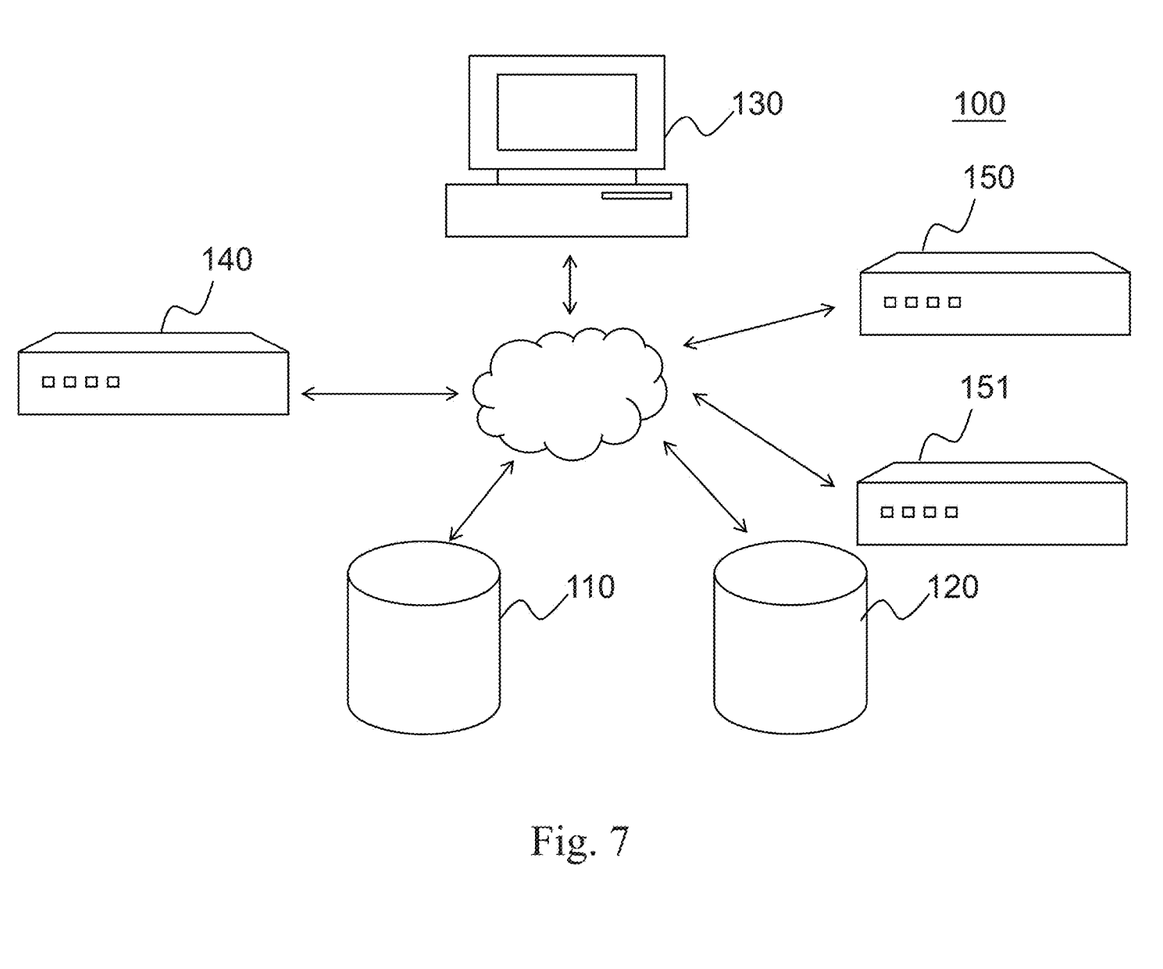
FIG. 7 shows another system for achieving non-interruptive data reconstruction according to the present invention.
Figure 8:
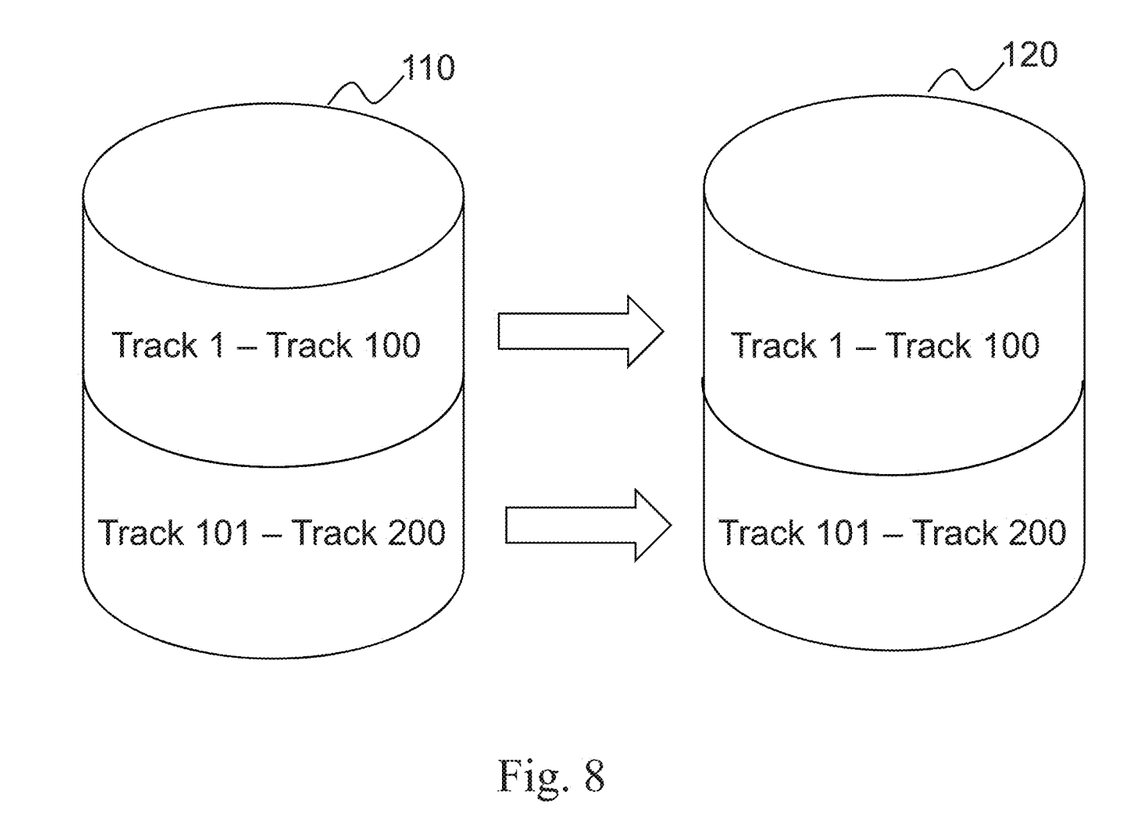
FIG. 8 illustrates how data copying is done between a source storage and a target storage.

In addition, if the SLA requests a shorter response time or the service operator wants to speed up snapshot copying operation, more than one data moving service units can be applied. Please see FIG. 7. An auxiliary data moving service unit 151 is linked to the system 100. As mentioned above, snapshots can be done for a portion of the source storage 110 instead of the whole source storage 110. Please refer to FIG. 8 at the same time. If we separate the source storage 110 into two portions, track 1 to track 100 and track 101 to track 200. Also, the target storage 120 is separated into two portions, track 1 to track 100 and track 101 to track 200. The data moving service unit 150 is in charge of copying or moving the source data in the blocks in the track 1 to track 100 in the source storage 110 to the track 1 to track 100 in the target storage 120. The auxiliary data moving service unit 151 is in charge of copying or moving the source data in the blocks in the track 101 to track 200 in the source storage 110 to the track 101 to track 200 in the target storage 120. Conventionally, the track 1 to track 100 in the source storage 110 is defined as a Logical Unit Number (LUN) device. The track 101 to track 200 in the source storage 110 is defined as another LUN device. Thus, the application of the present invention is not limited to data copying or data moving between two physical storages. Logical storages are applicable.

According to the embodiments above, it should be noticed that if the server 130 already had some functions of the agent module and the path IO module before they are installed, those functions should be kept while other functions the server 130 doesn't have can be implemented by the agent module and the path IO module. For example, the path IO module can leverage one existing multiple path IO element in the operation system of the server 130. It just provides modification or plugin for data moving or copying service needs. Similarly, if the operation system of the server 130 or the source and target storages already has close copying service, the data moving service unit 150 will leverage the local data copying service. Besides, based on the defined policy made by the service provider, aggressive snapshot copying or final switch-over during predicted low access time can be achieved. In other words, the defined policy is a controlling means which decides how efficient the data copying or moving can be done. The data moving service unit 150 can further gets a baseline of copying speed of one snapshot between the source storage 110 and the target storage 120 when access is low. The baseline can be sent to the traffic modeling unit 140 to create the action schedule and calculate an estimated completion time for each snapshot copying.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for achieving non-interruptive data reconstruction, comprising:
    a source storage, containing a source data;
    a target storage;
    a server, for accessing the source data in the source storage and any data stored in the target storage, installed with an agent module and a path IO module, wherein the agent module keeps collecting values of a performance parameter which present a status of accesses of the source data by the server and records changed blocks of the source storage to a bitmap table generated by the path IO module after a snapshot of the source storage; the path IO module decouples a storage name of the source storage which links to the server and couples to the storage name of the target storage; and linkage path of the server is switched over from the source storage to the target storage by the path IO module;
    a traffic modeling unit, for receiving the values of the performance parameter and providing a traffic status of data access in a particular time according to the received values of the performance parameter, and for providing an action schedule according to a defined policy and the traffic status of data access; and
    at least one data moving service unit, for snapshotting a portion or a whole source storage, copying a snapshot of the portion or the whole source storage to the target storage, and modifying changes of a new snapshot of the portion or the whole source storage compared with a previous one to a copied snapshot in the target storage according to the action schedule, and controlling operation of the agent module;
    wherein the agent module communicates with the traffic modeling unit and the at least one data moving service unit; the bitmap table contains a bit of 0 or 1 for each block in the source storage; 0 stands for no change in the corresponding block while 1 stands for change in the corresponding block between two successive snapshots; the switch-over is processed when number of 1 in a bitmap table is smaller than or equal to a threshold value; and wherein a procedure to operate the system comprises the steps of:
A. the traffic modeling unit providing the action schedule;
B. the data moving service unit instructing the source storage to snapshot a portion or the whole source storage, and the agent module to record the changed blocks of the source storage to the bitmap table with initiation of all 0;
C. the data moving service unit copying the snapshot to the same blocks in the target storage sequentially according to the action schedule;
D. the data moving service unit modifying changes of the snapshot of the portion or the whole source storage to the copied snapshot in the target storage;
E. repeating the step B to step D until the number of 1 in the bitmap table is smaller than or equal to the threshold value; and
F. the data moving service unit processing the switch-over of linkage path of the server from the source storage to the target storage, and/or relinking to the source storage.

2. The system according to claim 1, wherein the source storage is a Hard Disk Drive (HDD), a Solid State Drive (SSD), a Random Access Memory (RAM), or a mixture thereof, or is a Logical Unit Number (LUN) device, or is an object storage data.

3. The system according to claim 1, wherein the target storage is a Hard Disk Drive (HDD), a Solid State Drive (SSD), a Random Access Memory (RAM), or a mixture thereof, or is a Logical Unit Number (LUN) device, or is an object storage data.

4. The system according to claim 1, wherein the agent module is a software, a hardware or a firmware.

5. The system according to claim 1, wherein the path IO module is a software, a hardware or a firmware.

6. The system according to claim 1, wherein the performance parameters are Input/Output operations Per Second (IOPS), latency, and/or throughput.

7. The system according to claim 1, wherein the action schedule assigns a time for the portion or the whole source storage to be snapshotted, copying the snapshot of the portion or the whole source storage to the target storage, modifying changes of a new snapshot of the portion or the whole source storage compared with the previous one to the copied snapshot in the target storage and processing the switch-over to take place when the source storage is expected to encounter no accesses of data therein or light accesses of data.

8. The system according to claim 7, wherein the condition of light accesses of data is defined in a Service Level Agreement (SLA), a Quality of Service (QoS) requirement or a defined policy based on specifications of the source storage or the target storage.

9. The system according to claim 1, wherein the defined policy defines a delay time to stop copying the snapshot of the portion or the whole source storage to the target storage and modifying changes of a new snapshot of the portion or the whole source storage compared with the previous one to the copied snapshot in the target storage in case the said action fails to meet a requirement in a SLA or a QoS requirement.

10. The system according to claim 1, wherein the defined policy defines a waiting time to retry copying the snapshot of the portion or the whole source storage to the target storage or modifying changes of a new snapshot of the portion or the whole source storage compared with the previous one to the copied snapshot in the target storage in case the said action fails to meet a requirement in a SLA or a QoS requirement.

11. The system according to claim 1, wherein the storage name comprises model name, model number, and/or serial number of the source storage or the target storage.

12. The system according to claim 1, wherein the threshold value is 0.

13. The system according to claim 1, wherein the procedure further comprises a step B1 between step B and step C and a step G after step F:
B1. if step B to step D having been repeated at least once, the number of 1 in the bitmap table being smaller than the threshold value, and the traffic status of data access being expected low in a timeframe in the coming future so that the data moving service unit calculates to know that the copying of the snapshot can be finished within a requirement in a SLA, the data moving service unit initiating the agent module to hold all data write commands to the source storage; and
A. the data moving service unit instructing the agent module to release all data writes to the target storage and/or the source storage.

14. The system according to claim 13, wherein the threshold value is any integer smaller than 10.

15. The system according to claim 1, wherein the procedure further comprises a step B2 between step B and step C and a step E1 between step E and step F:
B2. if step B to step D having been repeated at least once, the number of 1 in the bitmap table being smaller than the threshold value, and the traffic status of data access being expected low in a timeframe in the coming future so that the data moving service unit calculates to know that the copying of the snapshot can be finished within a requirement in a SLA, the agent module informing the data moving service unit about new block write commands to the source storage; and
E1. the data moving service unit processing the new block write commands to the corresponding blocks in the target storage.

16. The system according to claim 15, wherein the threshold value is any integer smaller than 10.

* * * * *